United States Patent
Seol et al.

(10) Patent No.: US 10,564,442 B2
(45) Date of Patent: Feb. 18, 2020

(54) APPARATUS FOR DRIVING OPTICAL-REFLECTOR FOR OIS WITH MULTI-AXIAL STRUCTURE

(71) Applicant: JAHWA electronics Co., Ltd., Chungcheongbuk-do (KR)

(72) Inventors: Jin Soo Seol, Chungcheongbuk-do (KR); Kyoung Yong Lee, Chungcheongbuk-do (KR); Chul Soon Park, Chungcheongnam-do (KR)

(73) Assignee: JAHWA ELECTRONICS CO., LTD., Chungcheongbuk-Do (KR)

( * ) Notice: Subject to any disclaimer, the term of this patent is extended or adjusted under 35 U.S.C. 154(b) by 364 days.

(21) Appl. No.: 15/497,739

(22) Filed: Apr. 26, 2017

(65) Prior Publication Data
US 2018/0239161 A1    Aug. 23, 2018

(30) Foreign Application Priority Data
Feb. 20, 2017 (KR) .................. 10-2017-0022275

(51) Int. Cl.
*G02B 27/64* (2006.01)
*G02B 7/182* (2006.01)

(52) U.S. Cl.
CPC ......... *G02B 27/646* (2013.01); *G02B 7/1821* (2013.01)

(58) Field of Classification Search
CPC .................... G02B 27/646; G02B 7/1821
USPC ............................................. 359/555
See application file for complete search history.

(56) References Cited

U.S. PATENT DOCUMENTS

2019/0121103 A1*   4/2019   Bachar ............... G02B 13/0065

* cited by examiner

*Primary Examiner* — Thomas K Pham
*Assistant Examiner* — Mitchell T Oestreich
(74) *Attorney, Agent, or Firm* — The PL Law Group, PLLC

(57) ABSTRACT

An apparatus for driving an optical-reflector for optical image stabilization (OIS) with a multi-axial structure includes a support frame having a first groove rail formed therein, an optical-reflector disposed on the support frame to reflect light to a lens, a middle frame having a first guide rail corresponding to the first groove rail and a second groove rail formed therein, a base frame having a second guide rail formed corresponding to the second groove rail, a first ball disposed between the first groove rail and the first guide rail, a second ball disposed between the second groove rail and the second guide rail, a first driving unit configured to move the support frame in a first direction on the basis of the middle frame, and a second driving unit configured to move the middle frame in a second direction, different from the first direction, on the basis of the base frame.

7 Claims, 9 Drawing Sheets

APPARATUS FOR DRIVING OPTICAL-REFLECTOR FOR OIS WITH MULTI-AXIAL STRUCTURE

CROSS-REFERENCE TO RELATED APPLICATION AND CLAIM OF PRIORITY

The present application claims priority to Korean Patent Application KR 10-2017-0022275 filed on Feb. 20, 2017 in the Korea Intellectual Property Office, the disclosures of which are incorporated herein by reference.

BACKGROUND

Technical Field

The present disclosure relates to an apparatus for driving an optical-reflector, and more particularly, to an apparatus for driving an optical-reflector for optical image stabilization (OIS) by operating the optical-reflector for changing a path of light in multi-axial directions.

Background Art

Along with the development of hardware techniques and the change of user environments or the like, various and complicated functions are integrally implemented at a mobile terminal such as a smart phone, in addition to a basic function for communication.

A representative example is a camera module having an auto focus (AF) function and an optical image stabilization (OIS) function. Also, a voice recognition function, a fingerprint recognition function, an iris recognition function or the like are loaded on a portable terminal for authentication or security, and it is attempted to mount a zoom lens in which a plurality of lenses are grouped to adjust a focus distance variously.

A zoom lens is configured to have a plurality of lenses or lens groups, arranged in an optical axis direction in which light is input, different from a general lens, and thus the zoom lens has a longer length in its optical axis direction in comparison to general lenses. Light passing through the zoom lens is put into a photographing device such as a charge-coupled device (CCD) and a complementary metal-oxide semiconductor (CMOS), and then image data is generated therefrom by means of following processing.

When a zoom lens is installed to stand on a main board of a portable terminal like other general lenses, namely in a direction perpendicular to the main board, the portable terminal should ensure a space as much as a height of the zoom lens (or, a length in the optical axis direction), and so it is not easy to optimize the zoom lens for a small and light design, which is an intrinsic characteristic aimed by the portable terminal.

To solve this problem, there has been proposed a method for reducing a size of an optical system by adjusting an angle and size of lenses, an interval thereof, a focus distance or the like, but this method intrinsically has a limit since it is directed to physically reduce the size of a zoom lens or a zoom lens barrel, and also the intrinsic features of the zoom lens may be deteriorated.

In addition, an optical image stabilization (OIS) method generally applied in the art correctively move a lens or a lens module in two directions (X-axis and Y-axis directions) on a plane perpendicular to an optical axis direction (Z axis). If this method is applied to a zoom lens as it is, there are problems such as low space utilization caused by the shape, structure, functions or the like of the zoom lens, an increased volume of the device, and difficulty in ensuring precision.

Further, there has also been attempted a method for axially coupling an optical-reflector and rotating the optical-reflector in a certain direction to correct shaking of a photographed image based on a lens or a photographing device (CCD, CMOS or the like).

However, in this method, a load of the optical-reflector or a support to which the optical-reflector is coupled is applied in a specific direction, and also the force caused by the load is differentially applied according to a rotating distance of the optical-reflector. For this reason, the intensity of a driving power for moving the optical-reflector is not functionally proportional to the movement of the optical-reflector, and thus the optical-reflector does not linearly move according to the intensity of the driving power, which does not ensure precise control of optical image stabilization.

SUMMARY

The present disclosure is designed to solve the problems of the related art, and therefore the present disclosure is directed to providing an apparatus for driving an optical-reflector for OIS, which may ensure precise control of the optical-reflector in all directions for optical image stabilization.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided an apparatus for driving an optical-reflector for optical image stabilization (OIS) with a multi-axial structure, including: a support frame having a first groove rail formed therein; an optical-reflector disposed on the support frame to reflect light to a lens; a middle frame having a first guide rail corresponding to the first groove rail and a second groove rail formed therein; a base frame having a second guide rail formed corresponding to the second groove rail; a first ball disposed between the first groove rail and the first guide rail; a second ball disposed between the second groove rail and the second guide rail; a first driving unit configured to move the support frame in a first direction on the basis of the middle frame; and a second driving unit configured to move the middle frame in a second direction, different from the first direction, on the basis of the base frame.

Here, the second direction may be perpendicular to the first direction.

Also, the first groove rail of the present disclosure may have a rounded shape, and the support frame may rotate along a path corresponding to the first groove rail or the first guide rail.

In addition, the second groove rail of the present disclosure may have a rounded shape, and the middle frame may rotate along a path corresponding to the second groove rail or the second guide rail.

For example, the middle frame of the present disclosure may include a first plate and a second plate perpendicular to the first plate, and in this case, the first guide rail may be formed at an inner side of the first plate, and the second groove rail may be formed at an outer side of the second plate.

In addition, the first groove rail and the second groove rail of the present disclosure may be formed perpendicular to each other.

Further, the support frame of the present disclosure may have a first magnet, the middle frame may have a second magnet, and in this case, the first driving unit may be a first coil which generates an electromagnetic force to the first magnet, and the second driving unit may be a second coil which generates an electromagnetic force to the second magnet.

More particularly, the first magnet of the present disclosure may be respectively provided at a left side and a right side symmetric to each other based on a center portion of the support frame, and in this case, the apparatus may further include a first yoke provided at the middle frame at a location facing the first magnet, respectively.

In addition, the first groove rail of the present disclosure may be arranged in parallel on one surface of the support frame, the support frame may include a mounting portion protruding at a center portion of the two first groove rails so that the first magnet is mounted thereto, and the middle frame may have an opening formed at a portion facing the first magnet.

According to an embodiment of the present disclosure, since optical image stabilization in all directions is performed by an optical-reflector which inputs light into a lens, a structure for optical image stabilization may not be coupled to a zoom lens or a zoom lens carrier which has a relatively large size, and thus it is possible to minimize a size of the apparatus and also improve space utilization of the apparatus further.

According to another embodiment of the present disclosure, since rotation of the optical-reflector which changes a path of light is physically supported and guided by a guiding structure with a rounded shape and a point-contact structure with balls, the optical-reflector may physically rotate more flexibly. Also, since the optical-reflector may be moved in functionally proportion to a driving power for moving the optical-reflector, it is possible to improve the precision of optical image stabilization, and also minimize a power required for the optical image stabilization.

In the present disclosure, since structures for rotating and supporting the optical-reflector may be systematically combined, OIS in X-axial and Y-axial direction may be performed independently, and thus it is possible to perform optical image stabilization by adaptively reacting with hand shaking in any direction.

DETAILED DESCRIPTION

Figure 1:
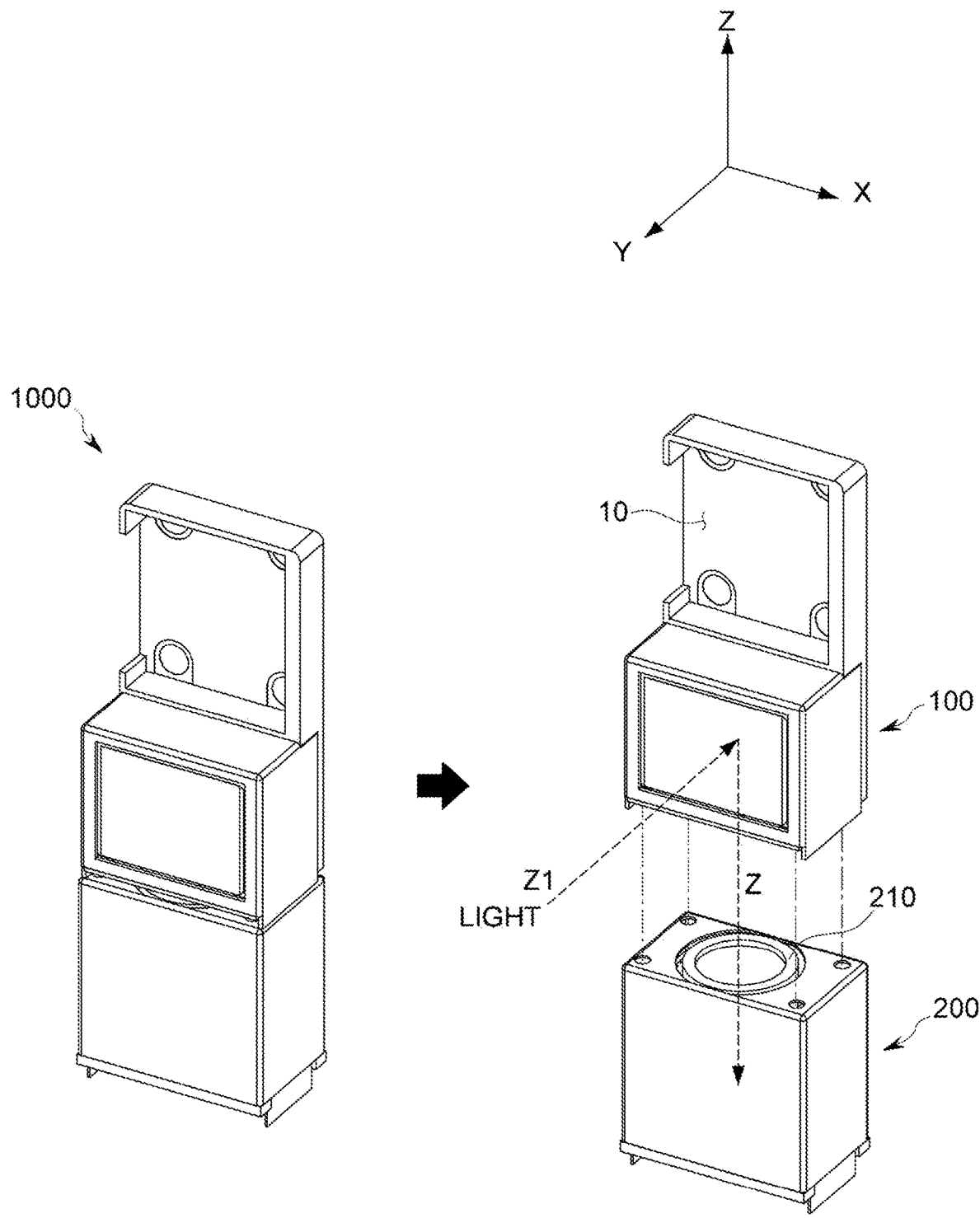
FIG. 1 is a diagram showing an overall configuration of an actuator to which a driving apparatus of the present disclosure is applied.

FIG. 1 is a diagram showing an overall configuration of an actuator 1000 to which an apparatus 100 for driving an optical-reflector for optical image stabilization (OIS) with a multi-axial structure according to an embodiment of the present invention (hereinafter, also referred to as a 'driving apparatus') is applied.

The actuator 1000 depicted FIG. 1 may include a driving apparatus 100 of an embodiment of the present invention, which moves an optical-reflector in both axial directions perpendicular to an optical axis to perform optical image stabilization (OIS), and a lens driving module 200 connected to the driving apparatus 100 and having a zoom lens 210 loaded thereon to implement auto focusing (AF) with respect to the zoom lens.

The driving apparatus 100 of an embodiment of the present invention may be implemented as a single device, or may also be implemented as a component of the actuator 1000 so as to be coupled to an upper portion or like of the lens driving unit 200, as shown in FIG. 1.

The lens 210 may be a single lens or a zoom lens including a plurality of lenses or lens groups or an optical member such as a prism, mirror or the like therein. If the lens 210 is a zoom lens or a zoom lens barrel, the lens 210 may be elongated in a vertical longitudinal direction (a Z-axis direction).

In an embodiment of the present invention, light of a subject or the like is not directly input to the lens 210, but the light is input to the lens 210 after its path is changed (refracted, reflected or the like) by an optical-reflector 110 (see FIG. 2) provided at the driving apparatus 100 of an embodiment of the present invention.

In FIG. 1, a path of light input from the external area is Z1, and a path of light formed by refracting or reflecting the path Z1 by means of the optical-reflector 110 and input to the lens 210 is Z. Hereinafter, Z will be called an optical axis or an optical axis direction.

In addition, though not shown in the figure, a photographing device such as CCD and CMOS for converting light signals into electric signals may be provided below the lens 210 on the basis of the optical axis direction, and a filter for passing or blocking light signals of specific frequency bands may also be provided together.

As explained later, in an embodiment of the present invention, the existing OIS method in which a lens is moved in two directions perpendicular to the optical axis Z, namely in an X-axis direction (a second direction) and a Y-axis direction (a first direction) is not used, but a technique for implementing OIS in a first direction and a second direction by using the optical-reflector 110, which changes a path of light, is used.

As shown in FIG. 1, the driving apparatus 100 of an embodiment of the present invention may further include a mounting space 10 at which an additional lens is mounted, and an additional lens or the like having an optical characteristic different from the lens 210 may be mounted at the lens mounting space 10. In some embodiments, the mounting space 10 may be not provided.

Figure 2:
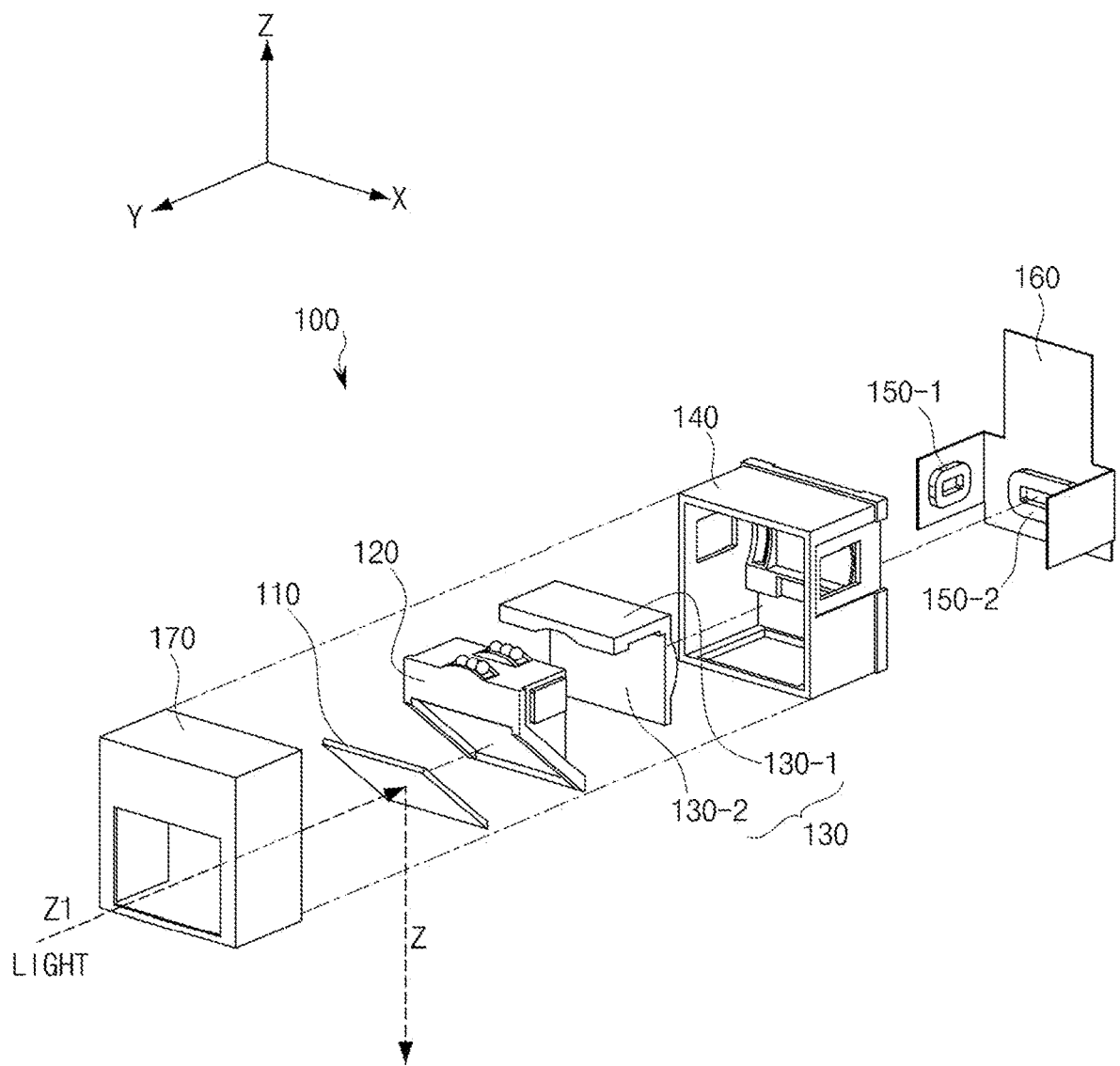
FIG. 2 is an exploded view showing a detailed configuration of the driving apparatus according to an embodiment of the present disclosure.

FIG. 2 is an exploded view showing a detailed configuration of the driving apparatus 100 according to an embodiment of the present disclosure. As shown in FIG. 2, the driving apparatus 100 of the present invention may include an optical-reflector 110, a support frame 120, a middle frame 130, a base frame 140, a first driving unit 150-1, a second driving unit 150-2, a circuit board 160 and a case 170.

First, referring to FIG. 2, overall configurations and relative relationship of the driving apparatus 100 of an embodiment of the present invention will be described, and detailed configuration of the driving apparatus 100 of an embodiment of the present invention and OIS operation in each direction will be described later.

As shown in FIG. 2, the light of an exterior subject is input into the driving apparatus 100 of an embodiment of the present invention through an opening formed in the case 170 via the path Z1, and the optical-reflector 110 of an embodiment of the present invention changes (refracts, reflects or the like) the path of the input light (to a Z-axial direction) so that the light is input to the lens 210.

The optical-reflector 110 for changing a path of light may be any one selected from a mirror and a prism, or a combination thereof, and may be implemented using various members capable of changing a path of light introduced form the external area to the optical axis direction. The mirror or prism may be made of glass material in order to improve optical performance.

As shown in FIG. 2, the driving apparatus 100 of an embodiment of the present invention may be configured so that the optical-reflector 110 refracts a path of light so that the light is input to the lens 210. Thus, the lens 210 may be installed in a length direction of a portable terminal, rather than a thickness direction thereof, which does not increase the thickness of the portable terminal and thus is optimized for a small and slim design of the portable terminal.

Based on the example depicted in FIG. 2, the optical-reflector 110 of an embodiment of the present invention is installed toward the opening of the case 170 through which light is introduced at the driving apparatus 100, namely in a front direction along the Y-axial direction.

In the following description, a vertical axial direction of the lens 210, namely a direction corresponding to a path of light input to the lens 210, is defined as an optical axis (Z axis), and two axes on a plane perpendicular to the optical axis (Z axis) are defined as X axis and Y axis.

As shown in FIG. 2 or the like, the optical-reflector 110 is disposed on the support frame 120 which physically supports the optical-reflector 110. A first magnet 121 is mounted to the support frame 120 of an embodiment of the present invention, and a first groove rail 123 for guiding rotation in an X-axial direction is formed therein. These configurations will be described in detail later.

The support frame 120 of an embodiment of the present invention for physically supporting the optical-reflector 110 is installed to be physically supported by the middle frame 130 in a state where the optical-reflector 110 is installed, as show in FIG. 2.

The support frame 120 of an embodiment of the present invention is installed to be capable of moving or rotating in an X-axial direction, which is one of two directions perpendicular to the optical axis on the basis of the middle frame 130, and as the support frame 120 moves or rotates, the optical-reflector 110 disposed on the support frame 120 physically moves together.

Meanwhile, the middle frame 130 of an embodiment of the present invention is configured to move or rotate in a Y-axial direction, which is perpendicular to the direction (X-axial direction) in which the support frame 120 rotates based on middle frame 130, among two directions perpendicular to the optical axis on the basis of the base frame 140.

For rotation (movement) of the middle frame 130, the middle frame 130 has a second magnet 135, and a second coil 150-2 for generating an electromagnetic force to the second magnet 135 is disposed on a circuit board 160 coupled to a side of the base frame 140, as illustrated in FIG. 2.

The first driving unit 150-1 of an embodiment of the present invention gives a driving force for moving the support frame 120 in an X-axial direction, and various examples may be applied thereto depending on embodiments. However, in consideration of power consumption, low noise, space utilization or the like, the first driving unit 150-1 may be implemented using a coil which uses an electromagnetic force as a driving force. If the first driving unit 150-1 is implemented using a first coil 150-1 as described above, a first magnet 121 for receiving the electromagnetic force generated by the first coil 150-1 is provided at the support frame 120 of an embodiment of the present invention.

In this point of view, the second driving unit 150-2 serving as a component for giving a driving force to move the middle frame 130 in a Y-axial direction may also be implemented using a second coil 150-2, and in this case, a second magnet 135 for receiving the electromagnetic force generated by the second coil 150-2 is provided at the middle frame 130 of an embodiment of the present invention.

In the following description, even though it is described that the first driving unit 150-1 is the first coil 150-1 for generating an electromagnetic force to the first magnet 121 and the second driving unit 150-2 is the second coil 150-2 for generating an electromagnetic force to the second magnet 135, this is just an example, and the first driving unit 150-1 and the second driving unit 150-2 are not limited to coils which generate an electromagnetic force by an applied power.

The first magnet 121 is installed at the support frame 120 so that the support frame 120 may move or rotate in an X-axial direction, and the first coil 150-1 for generating an electromagnetic force to the first magnet 121 is disposed on the circuit board 160 as shown in FIG. 2.

The optical-reflector 110 for changing a path of light introduced from the external area into a lens by means of the structure of an embodiment of the present invention depicted in FIG. 2 rotates in an X-axial direction as the support frame 120 rotates in the X-axial direction due to the electromagnetic force generated by the first magnet 121 and the first coil 150-1.

In addition, as the middle frame 130 rotates in a Y-axial direction due to the electromagnetic force generated by the second magnet 135 and the second coil 150-2, the support frame 120 loaded on the middle frame 130 rotates in the same direction, and accordingly the optical-reflector 110 of an embodiment of the present invention rotates in the Y-axial direction.

Since the support frame 120 of an embodiment of the present invention is configured to be independently rotatable on the basis of the middle frame 130, even though the middle frame 130 rotates in a Y-axial direction based on the base frame 140, the support frame 120 of an embodiment of the present invention may rotate in an X-axial direction independently as long as an electromagnetic force is generated at the first coil 150-1.

Figure 3A:
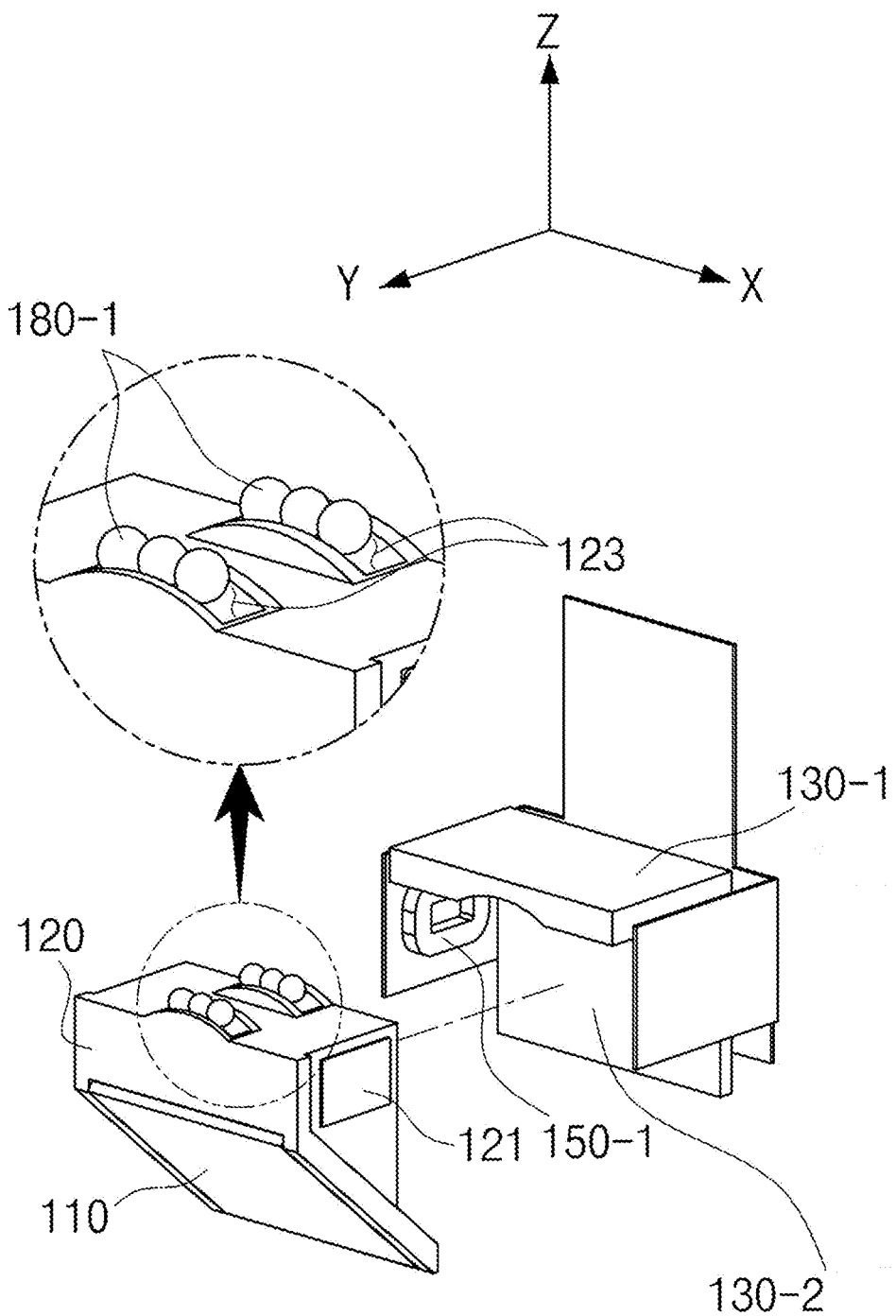
FIGS. 3A and 3B are diagrams showing a support frame, a middle frame and relevant components according to an embodiment of the present disclosure.
Figure 3B:
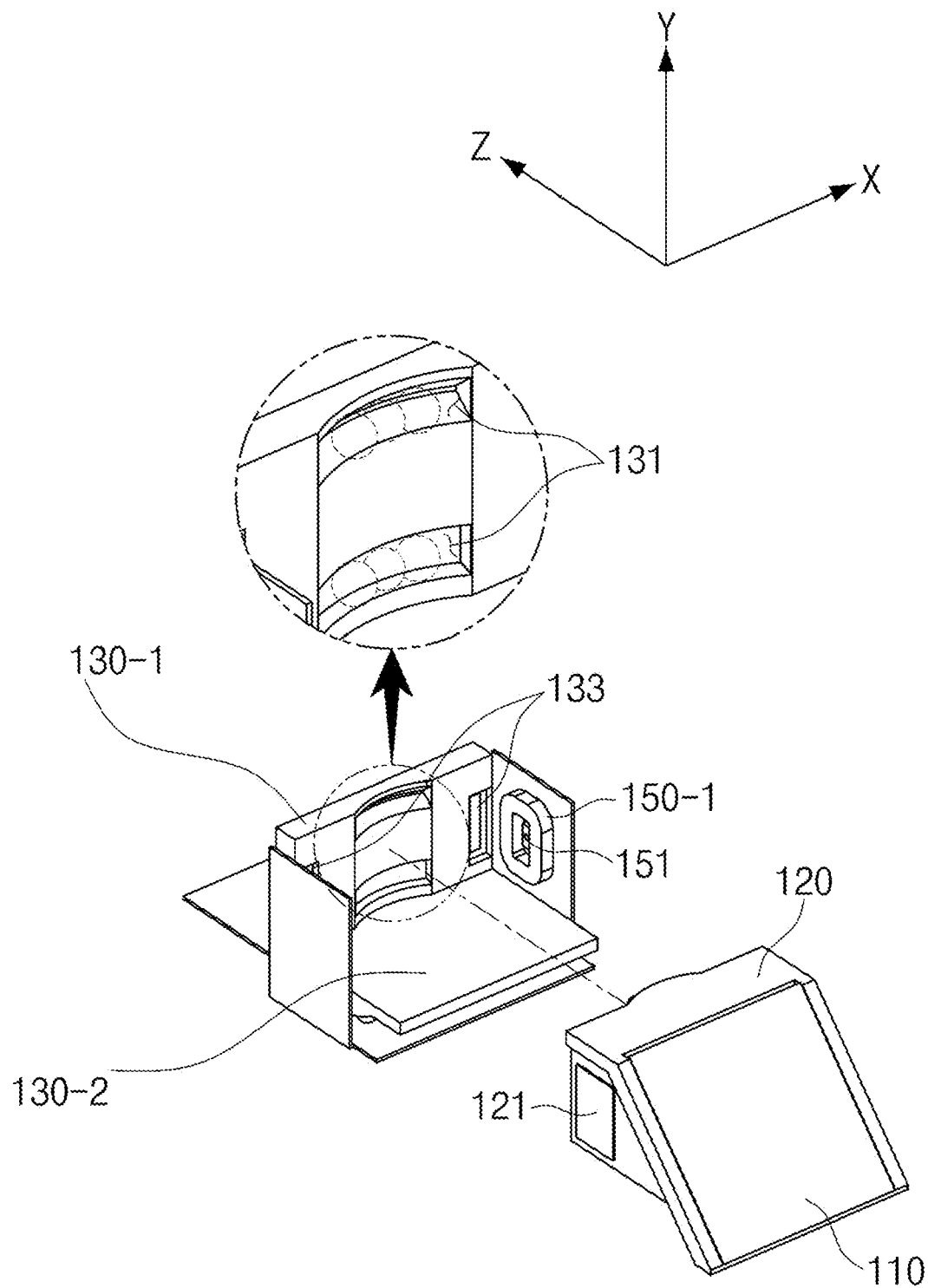

FIGS. 3A and 3B are diagrams showing a support frame 120, a middle frame 130 and relevant components according to an embodiment of the present disclosure.

As described above, the support frame 120 of an embodiment of the present invention is configured to be movable or rotatable in an X-axial direction on the basis of the middle frame 130, and for this, a first groove rail 123 is provided at the support frame 120 as shown in FIGS. 3A and 3B so that the support frame 120 is guided to rotate in an X-axial direction on the basis of the middle frame 130.

Since optical image stabilization is performed by moving the light of a subject, input to a photographing device, into a direction in which movement caused by hand shaking is compensated, the optical-reflector 110, namely the support frame 120 to which the optical-reflector 110 is coupled, may be configured to be rotatable.

For this, the first groove rail 123 formed at the support frame 120 is shaped to elongate in a length direction with a rounded shape as shown in the figures and also has an optimized curvature for rotation.

The middle frame 130 of an embodiment of the present invention, which accommodates the support frame 120 and physically supports rotation of the support frame 120, has a first guide rail 131 with a shape corresponding to the first groove rail 123, namely with a rounded shape, to elongate in a longitudinal direction at a location corresponding to the first groove rail 123 of the support frame 120 as shown in the figures.

The support frame 120 of an embodiment of the present invention rotates along a path corresponding to the first groove rail 123 with a rounded shape or the first guide rail 131 having a shape corresponding thereto.

In order to minimize shaking or separation of the support frame 120, the first groove rail 123 and the first guide rail 131 of an embodiment of the present invention may be arranged in two rows parallel to each other, and one of them may have a section with a V shape and the other may have a section with a U shape.

The middle frame 130 of an embodiment of the present invention may include a first plate 130-1 and a second plate 130-2 perpendicular to the first plate 130-1, and in this case, the first guide rail 131 is provided at the first plate 130-1 to face the first groove rail 123 of the support frame 120. As explained later, the second plate 130-2 may be arranged to guide that the middle frame 130 rotates based on the base frame 140.

As shown in FIGS. 3A and 3B, a plurality of first balls 180-1 are disposed between the first groove rail 123 and the second guide rail 141, and the support frame 120 and the middle frame 130 of an embodiment of the present invention may be kept in a separated state by means of the arrangement of the first balls 180-1, and the support frame 120 of an embodiment of the present invention may rotate in an X-axial direction based on the middle frame 130 with a minimized friction by the point-contact of the balls.

In some embodiments, the first balls 180-1 may be accommodated in the first groove rail 123 or the first guide rail 131 to a predetermined depth as shown in FIGS. 3A and 3B in order to suitably reduce a separating distance between the support frame 120 and the middle frame 130.

The support frame 120 of an embodiment of the present invention has the first magnet 121, and the first magnet 121 receives an electromagnetic force by means of the first coil 150-1 disposed at the circuit board 160, and the support frame 120 of an embodiment of the present invention rotates based on the middle frame 130 by using the electromagnetic force as a driving force.

The circuit board 160 may include a hall sensor 151 for detecting a location of a magnet (or, a moving body having the magnet) by means of a hall effect. If the hall sensor 151 detects a location of a magnet, a driver (not shown) performs feed-back control so that a power of suitable intensity and direction corresponding to the location of the magnet is applied to the first coil 150-1.

The optical image stabilization function in the first direction (X-axial direction) may be precisely implemented by performing feed-back control to detect the accurate location of the optical-reflector 110 and apply a power accordingly. The driver (not shown) may be implemented independently from the hall sensor 151 but may also be implemented in a single chip or module together with the hall sensor.

In addition, the middle frame 130 of an embodiment of the present invention may include a first yoke 133 made of a metal material with magnetism at a location facing the first magnet 121. The first yoke 133 generates an attractive force to the first magnet 121 provided at the support frame 120 to pull the support frame 120 toward the middle frame 130. Due to the attractive force, the support frame 120 is continuously in point-contact with the first ball 180-1, and it may be effectively prevented that the support frame 120 is deviated outwards.

As shown in FIGS. 3A and 3B, the first magnet 121 may be respectively provided at right and left sides of the support frame 120 to be symmetric with each other based on a central portion of the support frame 120 so that the horizontal balance of the support frame 120 (based on FIGS. 3A and 3B) is maintained and also the driving force for OIS may be more precisely implemented by the first coil 150-1 and the first magnet 121. Also, two first yokes 133 as described above may also be respectively disposed to face the first magnets 121 at the right and left sides.

By this arrangement, when optical image stabilization in an X-axial direction is completed, the support frame 120, namely the optical-reflector 110, may return to its original location more rapidly and accurately on the basis of the middle frame 130.

Figure 4A:
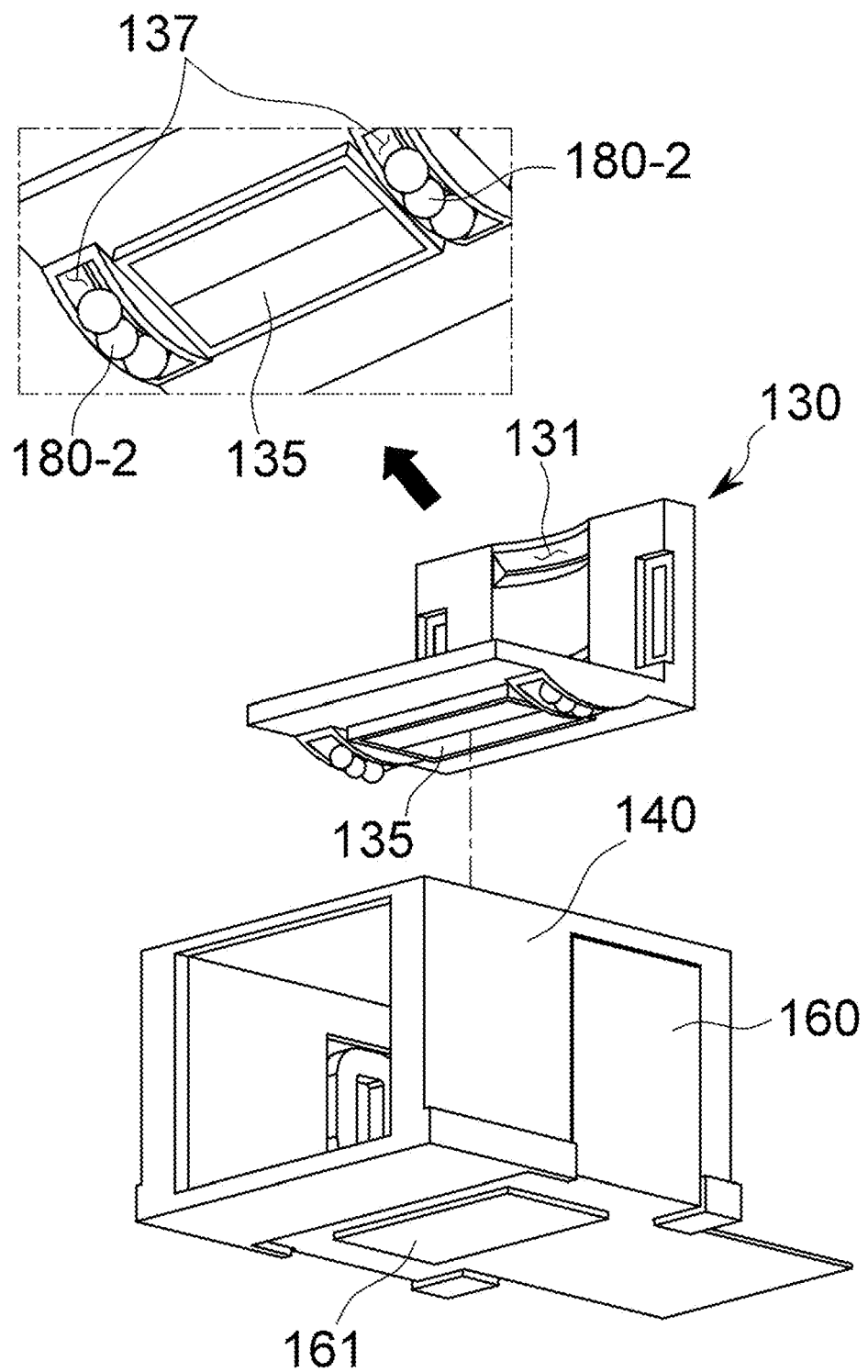
FIGS. 4A and 4B are diagrams showing a middle frame, a base frame and relevant components according to an embodiment of the present disclosure.
Figure 4B:
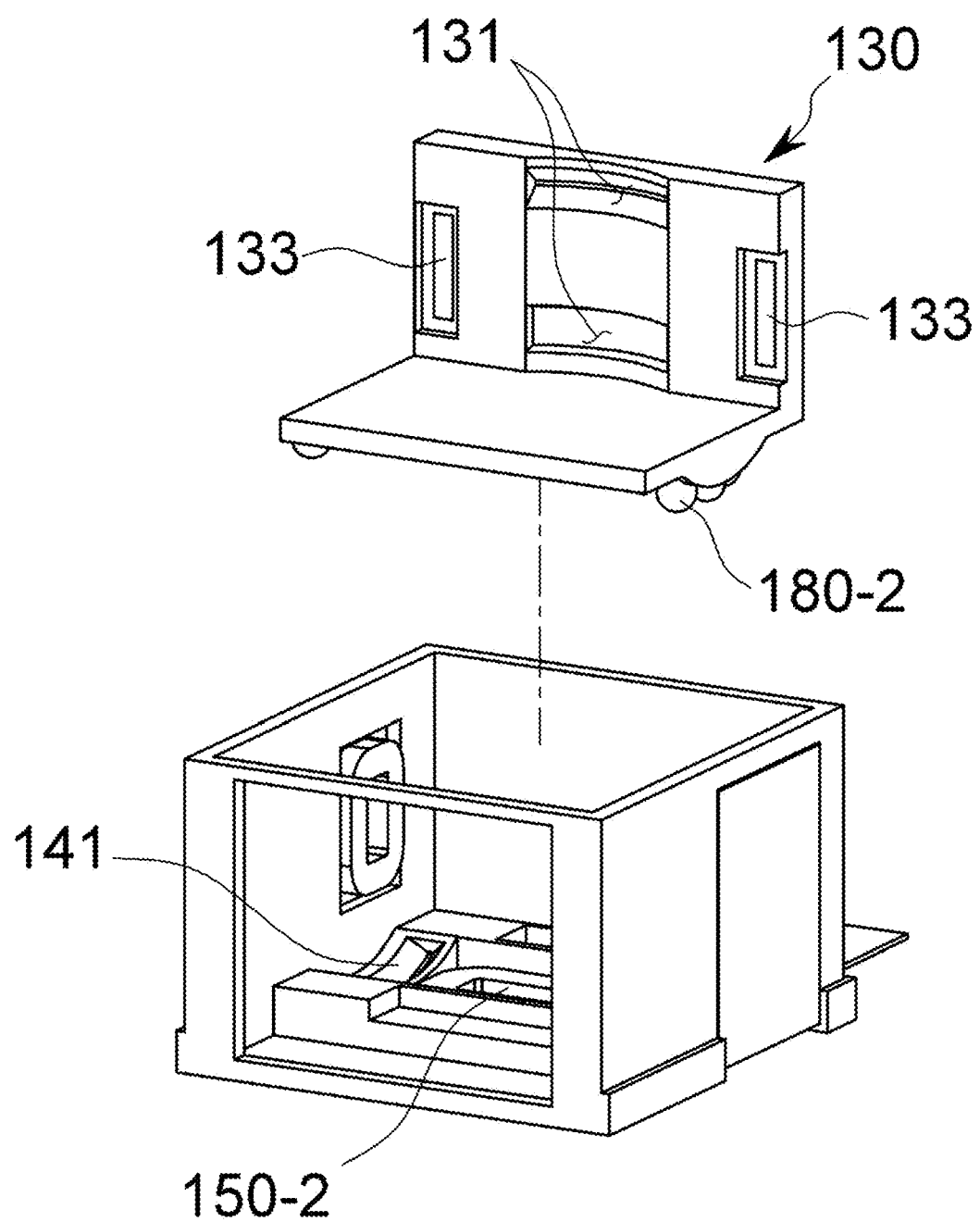

FIGS. 4A and 4B are diagrams showing a middle frame 130, a base frame 140 and relevant components according to an embodiment of the present disclosure. Hereinafter, the structure of an embodiment of the present invention where the middle frame 130 rotates in a Y-axial direction based on the base frame 140 will be described in detail with reference to FIGS. 4A and 4B.

The middle frame 130 of an embodiment of the present invention is an object physically supporting rotation of the support frame 120 in an X-axial direction as described above, and simultaneously serves as a rotating body which directly rotates in a Y-axial direction based on the base frame 140.

As shown in FIGS. 4A and 4B, the middle frame 130 of an embodiment of the present invention includes a second magnet 135 which receives an electromagnetic force generated by the second coil 150-2, and a second groove rail 137 is formed in the middle frame 130 to guide rotation of the middle frame 130 in a Y-axial direction.

The base frame 140 of an embodiment of the present invention accommodates the middle frame 130 and physically supports rotation of the middle frame 130 in a Y-axial direction, and a second guide rail 141 having a shape corresponding to the second groove rail 137 is provided at the base frame 140 so that rotation of the middle frame 130 may be effectively guided.

The second coil 150-2 of an embodiment of the present invention generates an electromagnetic force to the second magnet 135 so that the middle frame 130 moves in a second direction (Y-axial direction) perpendicular to the first direction (X-axial direction), on the basis of the base frame 140, and by means of the electromagnetic force, the middle frame 130 of an embodiment of the present invention rotates in the second direction (Y-axial direction) based on the base frame 140.

As described above, the second groove rail 137 provided at the middle frame 130 and the second guide rail 141 provided at the base frame 140 are shaped corresponding to each other, namely to elongate in a Y-axial direction, and also configured to have a rounded shape or optimized curvatures corresponding to each other so that rotation of the middle frame 130 may be effectively supported.

By means of the above configuration of the second groove rail 137 and the second guide rail 141, the middle frame 130 of an embodiment of the present invention rotates along a path corresponding to the second groove rail 137 or the second guide rail 141.

A plurality of second balls 180-2 are disposed between the second groove rail 137 and the second guide rail 141 so that the middle frame 130 of an embodiment of the present invention may rotate in a Y-axial direction more flexibly and accurately.

By means of the second ball 180-2, the middle frame 130 of an embodiment of the present invention may move with a minimal friction and keep a suitable distance from the base frame 140.

A second yoke 161 for pulling the second magnet 135 of the middle frame 130 toward the base frame 140 may be provided so that the middle frame 130 is not separated from the base frame 140 but effectively maintains point-contact with the second ball 180-2 as described above.

As shown in FIGS. 4A and 4B or the like, the second magnet 135 may be provided to a bottom surface (based on FIGS. 4A and 4B) of the second plate 130-2 where the first guide rail 131 is not provided at the middle frame 130, so that the middle frame 130 may support rotation of the support frame 120 and also simultaneously rotate based on the base frame 140, independently.

In this point of view, the first guide rail 131 provided at the middle frame 130 to guide rotation of the support frame 120 may be formed at an inner side (a central portion based on FIGS. 4A and 4B) of the first plate 130-1, and the second groove rail 137 provided at the middle frame 130 to guide rotation of the middle frame 130 based on the base frame 140 may be provided at an outer side (an outer portion based on FIGS. 4A and 4B) of the second plate 130-2, perpendicular to the first plate 130-1.

In addition, the first groove rail 123 provided at the support frame 120 and the second groove rail 137 provided at the middle frame 130 may be formed perpendicular to each other so that the movement of the support frame 120 in an X-axial direction and the movement of the middle frame 130 in a Y-axial direction may be implemented independently.

Meanwhile, in order to detect a location of the middle frame 130 in a Y-axial direction, a hall sensor for sensing a distance from the second magnet 135 may be provided at the circuit board 160.

The hall sensor detects a location of the second magnet 135, or a location of the middle frame 130 or the optical-reflector 110 having the second magnet 135. Since the change in height is greater at an end portion of a rotating body in comparison so a center portion thereof, a magnet may be further provided at an end portion of the middle frame 130 so that the hall sensor may detect a location of the magnet more effectively.

As described above, the optical-reflector 110 of an embodiment of the present invention reflects the input light to an optical axis (Z axis), and the base frame 140 of an embodiment of the present invention supports the optical-reflector 110 so that the optical-reflector 110 may move in two axial directions (X axis and Y axis) perpendicular to the optical axis.

As described above, the support frame 120 of an embodiment of the present invention is mounted on the base frame 140 to support the optical-reflector 110 and be movable in one axial direction, and the middle frame 130 of an embodiment of the present invention is located between the base frame 140 and the support frame 120 to support the optical-reflector 110 to be movable in a direction perpendicular to the moving direction of the support frame 120.

In an embodiment of the present invention, by means of the configuration where the middle frame 130 is disposed between the base frame 140 and the support frame 120 coupled to the optical-reflector 110, the support frame 120 and the middle frame 130 may move independently in directions perpendicular to each other, and thus the optical-reflector 110 may rotate (or, move) in X-axial and Y-axial directions perpendicular to the optical axis, thereby implementing optical image stabilization.

Figure 5:
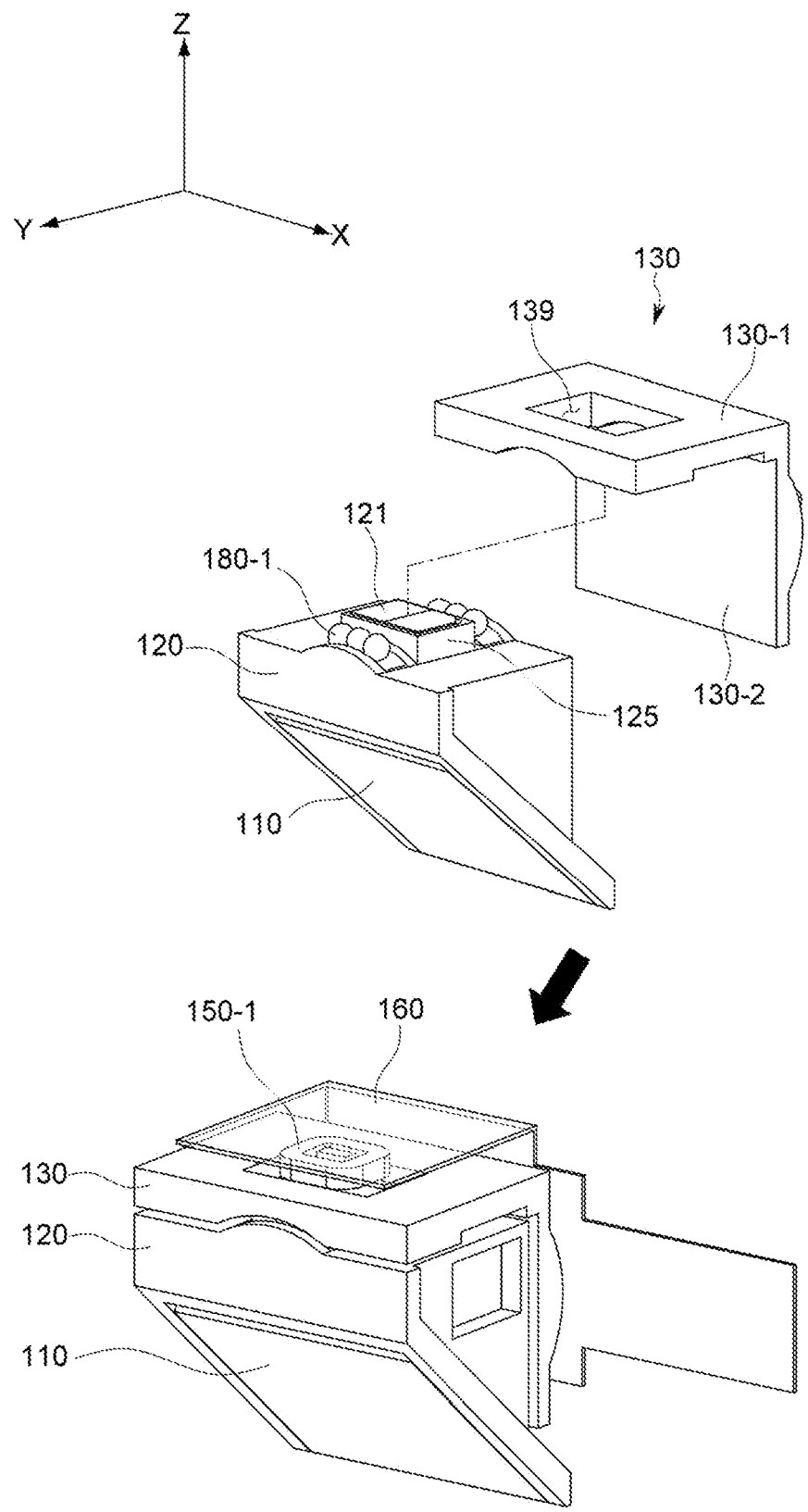
FIG. 5 is a diagram showing a driving apparatus according to another embodiment of the present disclosure.

FIG. 5 is a diagram showing a driving apparatus 100 according to another embodiment of the present disclosure.

In the embodiment of the present disclosure depicted in FIG. 5, a distance between the first magnet 121 and the first coil 150-1 is reduced so that optical image stabilization in an X-axial direction may be performed in a low-power environment.

As described above, the support frame 120 of an embodiment of the present invention includes the first magnet 121 which receives an electromagnetic force in an X-axial direction from the first coil 150-1. Here, as shown in FIG. 5, the first magnet 121 may be disposed at a center between two first groove rails 123 spaced apart from each other in parallel. In order to improve a horizontal balance, the first magnet 121 may have a suitable width.

At this time, a mounting portion 125 may be formed at the support frame 120 so that the first magnet 121 is mounted thereto. As shown in the figure, the mounting portion 125 is shaped to protrude toward the middle frame 130. By means of the mounting portion 125, when the first magnet 121 is mounted to the support frame 120, the first magnet 121 may be located closer to the middle frame 130.

The middle frame 130 of an embodiment of the present invention has an opening 139 formed at a portion facing the first magnet 121, and the width of the opening 139 is slightly greater than the width of the mounting portion 125, namely the first magnet 121, in order to ensure a sufficient space for the rotation of the first magnet 121.

By using this configuration, the first magnet 121 of an embodiment of the present invention may be partially inserted into the opening 139 of the middle frame 130, and thus it is possible to suppress the support frame 120 not to be separated or shaken in any direction other than the X-axial direction in which the support frame 120 rotates based on the middle frame 130.

As shown in a lower portion of FIG. 5, the first magnet 121 is exposed through the opening 139 of the middle frame 130, and the first magnet 121 protrudes toward the middle frame 130 as much as a height of the mounting portion 125. For this reason, the electromagnetic force generated from the first coil 150-1 may be concentrated on the first magnet 121 more intensively, thereby allowing the support frame 120 to be driven in an X-axial direction in a lower-power environment.

Figure 6:
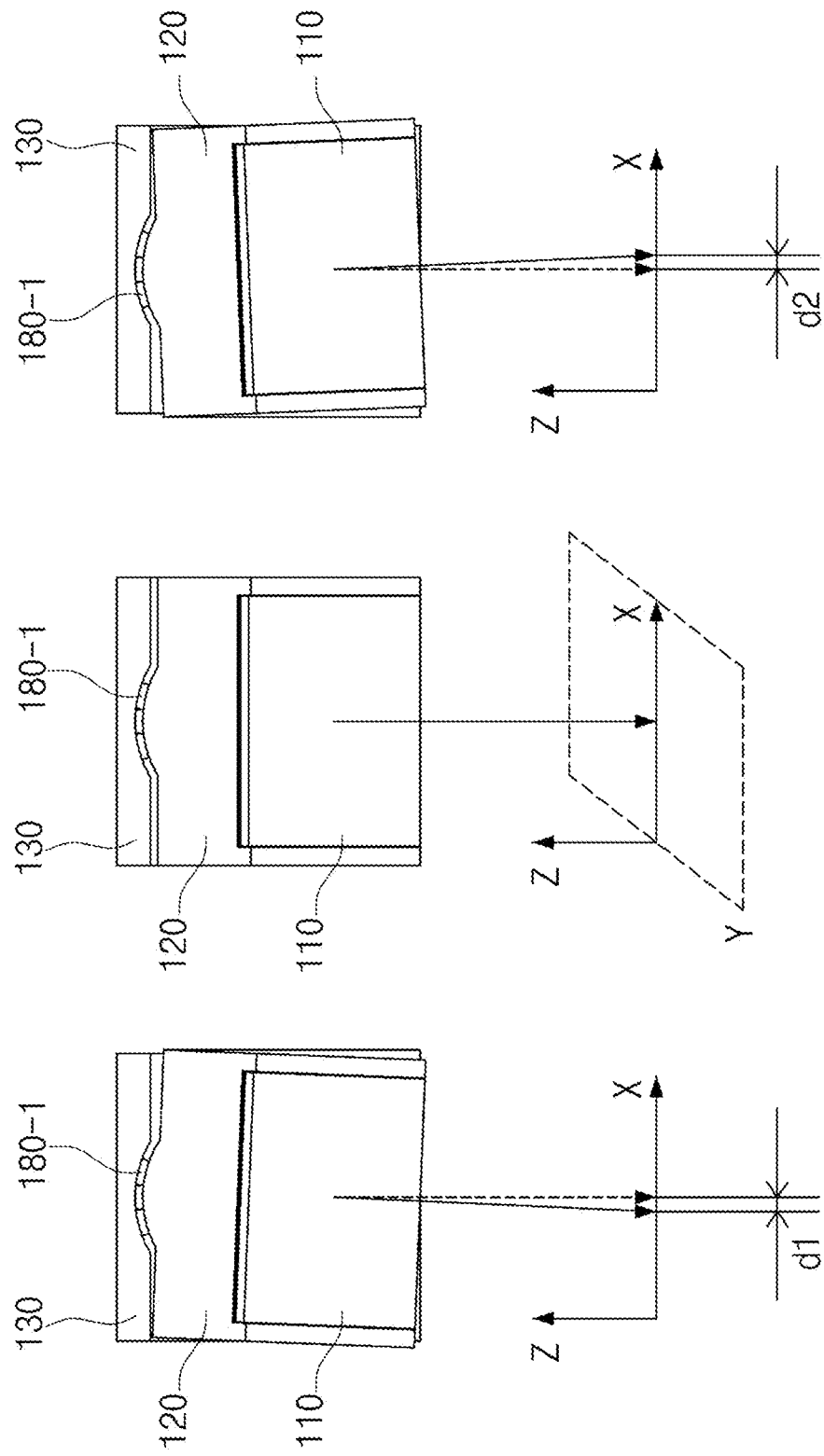
FIG. 6 is a diagram for illustrating X-axial OIS of the present disclosure, implemented by rotating an optical-reflector.
Figure 7:
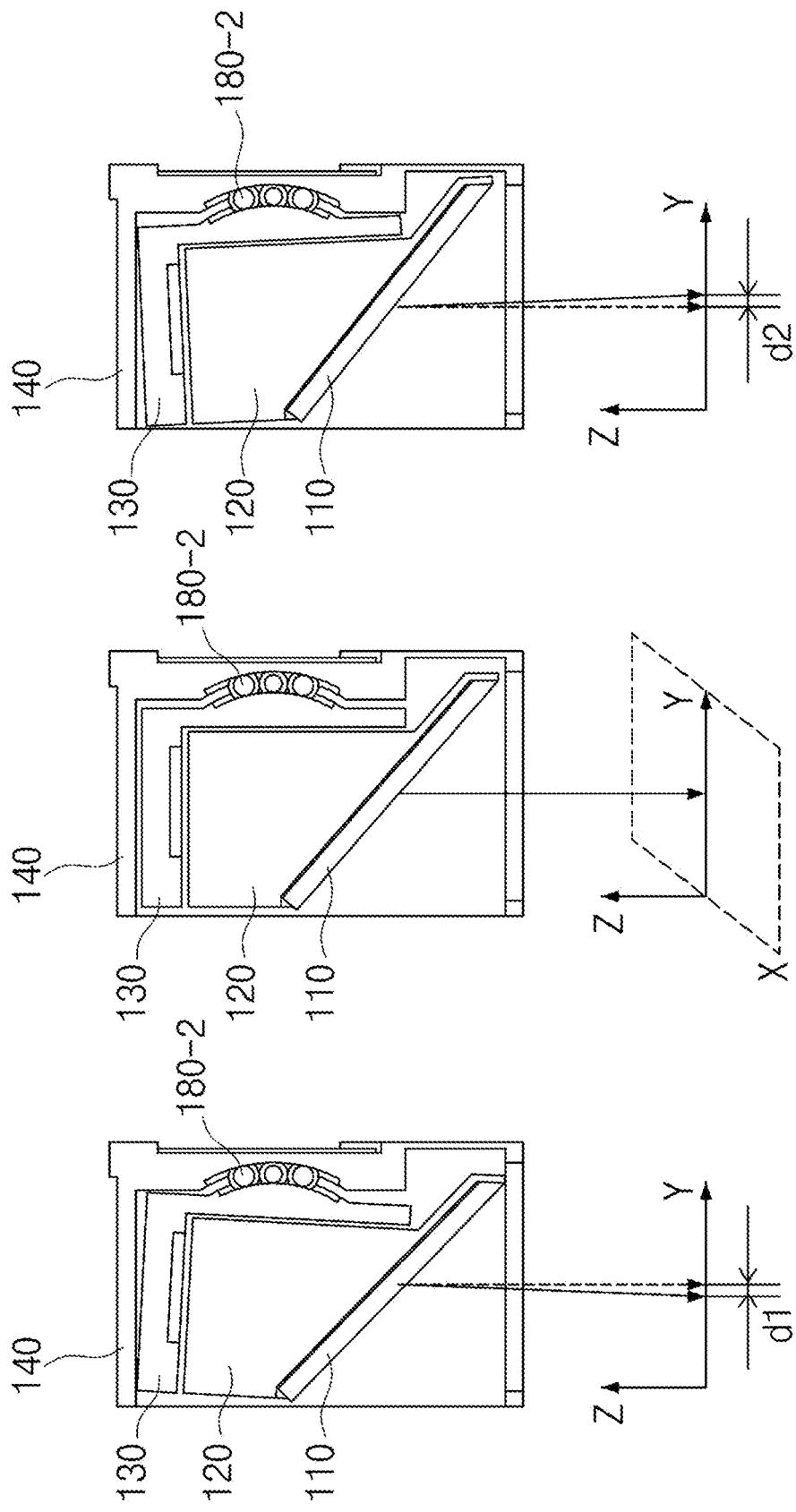
FIG. 7 is a diagram for illustrating Y-axial OIS of the present disclosure, implemented by rotating an optical-reflector.

FIG. 6 is a diagram for illustrating X-axial OIS of an embodiment of the present invention, implemented by rotating the optical-reflector 110, and FIG. 7 is a diagram for illustrating Y-axial OIS of an embodiment of the present invention, implemented by rotating the optical-reflector 110 caused by the rotation of the middle frame 130.

First, referring to FIG. 6, a process of performing optical image stabilization in an X-axial direction according to the rotation of the optical-reflector 110 of an embodiment of the present invention, namely the rotation of the support frame 120 on which the optical-reflector 110 is disposed will be describe.

As described above, if a power of suitable intensity and direction is applied to the first coil 150-1, the first magnet receives an electromagnetic force, and by using the electromagnetic force, the support frame 120 at which the first magnet 121 is installed moves. The support frame 120 moves as being guided by the shape of the first groove rail 123 or the first guide rail 131, and thus the support frame 120 makes rotation.

A central portion of FIG. 6 depicts the optical-reflector 110, the support frame 120 and the middle frame 130, which are at original reference locations where optical image stabilization is not performed.

Light of an external area is input through the path Z1, and then its path is changed by the optical-reflector 110 of an embodiment of the present invention as shown in the central portion of FIG. 6, and then the light is input to the lens 210 in an optical axis direction (Z-axial direction).

If external shaking in an X-axial direction caused by hand shaking or the like is transferred, the driver (not shown) of an embodiment of the present invention performs feed-back control to the hall sensor 151, which senses a location of the optical-reflector 110 (in detail, the first magnet 121 mounted to the support frame 120 or a magnet provided for sensing) so that a power of suitable intensity and direction for correcting a location in an X-axial direction is applied to the first coil 150-1.

If an electromagnetic force is generated between the first coil 150-1 and the first magnet 121 by means of the above feed-back control, the generated electromagnetic force is used as a driving force to rotate the support frame 120, or the optical-reflector 110 mounted to the support frame 120, to correct movement caused by hand shaking.

If the electromagnetic force generated at the first coil 150-1 rotates the support frame 120 mounted at the optical-reflector 110 in a clockwise direction as shown in a left portion of FIG. 6, the input light causes a displacement d1 in a left direction by means of the rotation of the optical-reflector 110, and thus in view of a lens or a photographing device such as CCD, correction is made in an X-axial direction (a left direction, based on FIG. 6).

In this point of view, if the generated at the first coil 150-1 rotates the optical-reflector 110 in a counterclockwise direction as shown in a right portion of FIG. 6, the input light causes a displacement d2 in a right direction, and thus in view of a lens or a photographing device such as CCD, correction is made in an X-axial direction (a right direction, based on FIG. 6).

As described above, in an embodiment of the present invention, optical image stabilization is performed in a specific direction by rotating the optical-reflector 110, and further the rotation of the optical-reflector 110 is physically supported and guided by the first groove rail 123, the first guide rail 131 and the first ball 180-1 with curvatures to ensure more precise driving control and also allow operation with a minimized power.

FIG. 7 depicts that optical image stabilization is performed in a Y-axial direction by rotating the middle frame 130 based on the base frame 140 so that the support frame 120 accommodated in the middle frame 130 rotates and also the optical-reflector 110 mounted to the support frame 120 rotates.

A central portion of FIG. 7 depicts a reference state where optical image stabilization in a Y-axial direction is not performed.

If an electromagnetic force generated at the second coil 150-2 rotates the middle frame 130 in a clockwise direction as shown in a left portion of FIG. 7, the optical-reflector 110 also rotates in the same direction accordingly, and so the input light makes a displacement d1 in a left direction. Thus, in view of a lens or a photographing device such as CCD, correction is made in the Y-axial direction (a left direction based on FIG. 7).

In this point of view, if an electromagnetic force generated at the second coil 150-2 rotates the middle frame 130 in a counterclockwise direction as shown in a right portion of FIG. 7, the input light makes a displacement d2 in a right direction, and so, in view of a lens or a photographing device such as CCD, correction is made in a Y-axial direction (a right direction based on FIG. 7).

Even though the embodiment of the present disclosure has been described based on an example where the support frame 120 rotates in an X-axial direction and the middle frame 130 rotates in a Y-axial direction, it is also possible that the support frame 120 rotates in a Y-axial direction and the middle frame 130 rotates in an X-axial direction depending on embodiments, as long as they rotate in directions perpendicular to each other.

The present disclosure has been described in detail. However, it should be understood that the detailed description and specific examples, while indicating exemplary embodiments of the disclosure, are given by way of illustration only, since various changes and modifications within the scope of the disclosure will become apparent to those skilled in the art from this detailed description.

What is claimed is:

1. An apparatus for driving an optical-reflector for optical image stabilization (OIS) with a multi-axial structure, comprising:
   a support frame having a first groove rail formed therein;
   an optical-reflector disposed on the support frame to reflect light to a lens;
   a middle frame having a first guide rail and a second groove rail formed therein, the first guide rail corresponding to the first groove rail;
   a base frame having a second guide rail formed corresponding to the second groove rail;
   a first ball disposed between the first groove rail and the first guide rail;
   a second ball disposed between the second groove rail and the second guide rail;
   a first driving unit configured to move the support frame in a first direction on the basis of the middle frame; and
   a second driving unit configured to move the middle frame in a second direction, different from the first direction, on the basis of the base frame,
   wherein the middle frame includes a first plate and a second plate extending perpendicularly from the first plate, the first plate has an inner surface facing the first groove rail of the support frame and an outer surface opposite to the lower surface, and the second plate has an inner surface facing the support frame and an outer surface opposite to the first surface;
   the first guide rail is formed on the inner surface of the first plate in a direction perpendicular to a direction in which the second plate is extended, and the second groove rail is formed at the outer surface of the second plate in a direction in which the second plate is extended from the first plate; and the first groove rail and the second groove rail are formed perpendicular to each other.

2. The apparatus of claim 1, wherein the second direction is perpendicular to the first direction.

3. The apparatus of claim 1, wherein the first groove rail has a rounded shape; and the support frame rotates along a path corresponding to the first groove rail or the first guide rail.

4. The apparatus of claim 1, wherein the second groove rail has a rounded shape; and the middle frame rotates along a path corresponding to the second groove rail or the second guide rail.

5. The apparatus of claim 1, wherein the support frame has first magnets;

the middle frame has a second magnet, and the first driving unit is first coils which generates an electromagnetic force to each of the first magnets, and the second driving unit is a second coil which generates an electromagnetic force to the second magnet.

6. The apparatus of claim 5, wherein the first magnets are respectively provided at a left side of the support frame and a right side of the support frame, and are symmetric to each other based on a center portion of the support frame.

7. The apparatus of claim 6, further comprising:

first yokes provided at the middle frame at locations facing the first magnets, respectively.

\* \* \* \* \*